United States Patent Office 3,367,956
Patented Feb. 6, 1968

3,367,956
PREPARATION OF BIURET POLYISOCYANATES
Hans Joachim Hennig, Cologne-Stammheim, and Otto Bayer, Erwin Windemuth, and Wilhelm Bunge, Leverkusen, Germany, assignors to Farbenfabriken Bayer Aktiengesellschaft, Leverkusen, Germany, a German corporation
No Drawing. Filed Apr. 1, 1964, Ser. No. 356,650
Claims priority, application Germany, Apr. 13, 1963, F 39,482
6 Claims. (Cl. 260—453)

This invention relates to organic polyisocyanates and more particularly to a process for the preparation of biuret polyisocyanates. Moreover, this invention provides a new and unexpected way of preparing biuret polyisocyanates which may also contain carbamyl groups without the formation of undesirable by-products.

It is known to prepare biuret polyisocyanates, for example, according to the method of German Patent 1,101,394, by reacting an organic diisocyanate with water. The heretofore known method produces a biuret polyisocyanate including carbon dioxide as a by-product which must be removed from the reaction mixture. It is desirable to obtain this type of product without the formation of undesirable by-products.

It has been proposed in German Patent 883,504 to react ureas with isocyanates to prepare a reaction mixture having a high isocyanate content. The heretofore known process results only in condensation products which could be hardened by heating and thus could only be used for the production of coatings or baked enamels for wire coating.

Ureas are also known to react with diisocyanates according to "Angewandte Chemie" 72 (1960), page 1002. The products there disclosed are substituted ureas and low-boiling monoisocyanates.

It is therefore an object of this invention to provide an improved process for the production of biuret polyisocyanates. Another object of this invention is to provide a process for the preparation of biuret polyisocyanates while avoiding the formation of useless by-products. A further object of this invention is to provide a method of simultaneously preparing a biuret polyisocyanate and a low molecular weight volatile organic monoisocyanate. Still another object of this invention is to provide a process for the preparation of a carbamyl biuret polyisocyanate with the formation of undesirable by-products. A further object of this invention is to provide a process for the preparation of biuret polyisocyanates including those which contain carbamyl groups and contain at least three —NCO groups per molecule which are substantially free of gaseous contaminates.

The foregoing objects and others which will become apparent from the following description are accomplished in accordance with the invention, generally speaking, by providing a process for the prepartion of biuret polyisocyanates wherein at least three mols of an organic diisocyanate are reacted with a substituted urea, in such proportions that there are at least three mols of organic diisocyanate present per mol of said substituted urea, at least in the later stage of the reaction at an elevated temperature with the continuous removal of the organic monoisocyanate formed in the reaction. It is an essential condition for this reaction to take place that the organic monoisocyanate is removed substantially as soon as it is formed. German Patent 883,504 referred to above, shows, inter alia, the reaction of ureas with polyisocyanates. Moreover, that German patent discloses that the high molecular weight condensation products containing isocyanate groups, which are formed by the process disclosed, are freed of unreacted starting material after completion of the reaction by extraction of the product with aliphatic or cycloaliphatic hydrocarbons. When following the procedure of the present invention, it is critical to elevate the temperature at least in the later stage of the reaction to about 150–250° C. to bring about formation of monoisocyanate which must be continuously removed substantially as soon as it is formed, preferably by operating at the elevated temperature at a reduced pressure or by using a carrier gas to remove the organic monoisocyanate from the reaction mixture substantially as soon as it is formed. Then the well-defined biuret polyisocyanates of the invention are formed instead of high molecular weight condensation products. Thus, it is an essential feature of this invention to carry out the process under such temperature conditions that a monoisocyanate is split off and the reactants may recombine to form a biuret polyisocyanate. Instead of high molecular weight condensation products referred to in the German patent, when the present procedure is followed, one obtains polyvalent isocyanates with biuret groupings which are well-defined and preferably correspond substantially to the general formula:

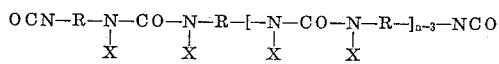

or those with a carbamyl biuret structure which correspond to the general formula:

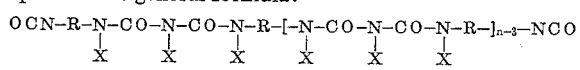

In the foregoing formulas, $n$ represents a positive integer greater than 2, X represents hydrogen or the grouping —CO—NX—R—NCO and X represents the latter groupings at least once in the molecule. The group represented by R may be the same or different divalent group which is obtained by removing the —NCO groups from the diisocyanates which are used as starting materials.

The starting materials may be represented by the following general formula:

Diisocyanate:
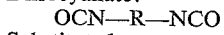
Substituted ureas:
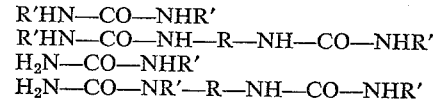

The order of the list is simultaneously the order of practical importance of the urea starting material. It is essential that the substituted ureas contain at least one grouping NHR'—CO. Bis-ureas of the type

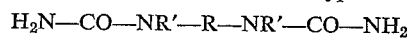

do not work.

Specific examples in support of these formulas may be found below in working Examples 1 through 18. R preferably has 1–18 carbon atoms and R' preferably has 1–6 carbon atoms. A monoisocyanate, R'—NCO, is continuously formed and removed from the reaction mixture. R' represents a monovalent organic radical and may be aliphatic, cycloaliphatic, aromatic, linear or branched, saturated or unsaturated and can contain hetero atoms. R' is obtained by removing one of the N-substituted organic radicals from the substituted ureas referred to above and specifically set forth below.

Any suitable organic diisocyanate may be used either alone or in admixture with one another. The diisocyanates which are useful in the process of the present invention are preferbly monomers and include those whose —NCO groups have substantially the same reactivity rates, such as tetramethylene diisocyanate, hexamethylene diisocyanate, cyclohexane-1,4-diisocyanate, dicyclohexylmethane - 4,4' - diisocyanate, xylylene diisocyanate, p- phenylene diisocyanate, diphenylmethane-4,4'-diisocyanate, diphenyldimethylmethane-4,4'-diisocyanate, 3,3'-dimethoxy-diphenylmethane-4,4'-diisocyanate and the like. Also very suitable are those diisocyanates whose —NCO groups have different reactivity rates, for example, 1-methylbenzene-2,4-diisocyanate, 1-methylbenzene-2,6-diisocyanate, 1-chlorobenzene-2,4-diisocyanate, 3-methyldiphenylmethane-4,4'-diisocyanate, 1-methyl-cyclohexane-2,4-diisocyanate and the like. Perchlorinated arylene diisocyanates are also suitable such as, for example, perchloro-m-phenylene diisocyanate or 1-methyl-3,5,6-chlorobenzene-2,4-diisocyanate. Also suitable are phosphoric acid aryl ester isocyanates, such as described in German patent specification 1,126,379, e.g. tris-(4-isocyanatophenyl) phosphate.

It is also possible to concurrently use triisocyanates, for example, 1-methylbenzene-2,4,6-triisocyanate, diphenylmethane-2,4,4' - triisocyanate, 3-methyl-diphenylmethane-4,6,4'-triisocyanate and triphenylmethane-4,4',4''-triisocyanate. The triisocyanates should be present only in relatively minor amounts, less than 30 percent by weight of the whole amount of isocyanate used and in addition to 3 mols of diisocyanate used per mol of urea.

All these polyisocyanates can be obtained by phosgenation of the corresponding amines. Reaction products of higher molecular weight obtained from the polyisocyanates, for example, by reacting compounds containing hydroxyl groups with excess of polyisocyanate, cannot be used to produce the polyisocyanates with a biuret structure. Thus, the isocyanates are preferably free of urethane groups.

Any suitable substituted urea may be used including, for example, symmetrically disubstituted ureas, bis-ureas which are disubstituted on the terminal nitrogen atoms and monosubstituted ureas as more particularly represented by the formulas above. Any suitable disubstituted urea may be used such as, for example, N,N'-dimethyl urea, N-methyl-N'-cyclohexyl urea, N,N'-diethyl urea, N-ethyl-N'-butyl urea, N,N'-di-n-propyl urea, N,N'-diisopropyl urea, N,N'-di-n-butyl urea, N,N'-di-t-butyl urea, N,N'dihexyl urea, N,N'-diallyl urea, N,N'-di-(3-methoxypropyl) urea, N,N'-dicyclohexyl urea, N,N'-dibenzyl urea, N,N'-diphenyl urea, N,N'-di-(p-chlorophenyl) urea and the like.

Any suitable bis-urea which is substituted on the first and fourth nitrogen atom may be used including, for example, $N^1,N^4$-diethyl ethylene bis-urea, the reaction product of one mol of ω,ω'-diamino-di-n-propyl ether with two mols of allyl isocyanate, compounds such as those obtained, for example, by reacting acrylonitrile with ethylene glycol, followed by hydrogenation to the diamine and the conversion thereof with monoisocyanate into a bis-urea. In addition, it is also possible to use small proportions of polyalkyl polyureas.

Specific examples of monosubstituted ureas include methyl urea, ethyl urea, isopropyl urea, t-butyl urea, hexyl urea, allyl urea, cyclohexyl urea, benzyl urea, phenyl urea, m-chlorophenyl urea and the like.

Trisubstituted ureas, such as trimethyl urea, can also be concurrently used and from these there are obtained, in the most favorable case, one mol of monoisocyanate per mol of trisubstituted urea. The dimethylamino group formed in the reaction acts as a chain stopper for the isocyanate polyaddition reaction and thus serves to modify the polyisocyanate. When the diisocyanate reacts with the ureas, a biuret monoisocyanate or a carbamyl biuret diisocyanate should be formed first of all. Then at a high temperature, that is between about 150° and 250°, the monoisocyanate splits off and reduces the size of the molecule. As the reaction progresses, additional molecules of diisocyanate react with the hydrogen atoms on the urea or biuret isocyanates. At the high temperature the splitting off of monoisocyanate and the addition of an organic diisocyanate proceeds simultaneously, finally leading to products which correspond to the indicated formulas. While it is possible to carry out the invention using an excess of three mols of diisocyanate for each mol of urea, it is advantageous to use larger excesses, preferably 6 to 10 mols of diisocyanate per mol of urea. When the larger excess is used, the diisocyanate functions as a solvent for the biuret polyisocyanate or carbamyl biuret polyisocyanate which results from the reaction. When the reaction has reached the desired stage and after removal of all of the monoisocyanate formed, the excess monomeric diisocyanate can be separated from the biuret polyisocyanate by distillation, by a thin film evaporator or by extraction with an organic solvent such as hexane, benzene, xylene, toluene or the like.

In carrying out the process of the invention, the organic diisocyanate and the substituted urea are mixed in the critical proportions set forth above. Usually the substituted urea dissolves readily in the organic diisocyanate with moderate heating and some reaction. When the temperature is increased, that is to about 150° C.–250° C., the organic monoisocyanate begins to split off as explained above and there is further reaction and consequently further addition of the organic diisocyanate. The removal of the organic monoisocyanate is accomplished as set forth above. The progressive removal of the monoisocyanate is preferably accelerated by carrying out the reaction under reduced pressure or by continuously stripping the reaction mixture with the aid of an inert carrier gas such as nitrogen or the like. It is sometimes desirable to carry out the reaction in the presence of inert organic solvents since this facilitates the preparation of more uniform reaction products. The solvent preferably has a boiling point considerably different and preferably higher than that of the organic monoisocyanate so that a satisfactory separation of the two can be effected. Suitable solvents are, for example, chlorinated aliphatic and aromatic hydrocarbons such as methylene chloride, orthodichlorobenzene and the like, ethylene glycol, monomethylether acetate, dioxane and other inert ether and ester solvents which are free of hydrogen atoms capable of reacting with —NCO groups.

The products of the process are either solid resins or viscous liquids. Aromatic diisocyanates usually lead to crumbly resins, whereas aliphatic diisocyanates produce more or less viscous liquids. The biuret polyisocyanates of the invention have good solubility in organic solvents. Furthermore, they are compatible with the active hydrogen containing compounds or resins which are normally employed in the production of polyurethane plastics including hydroxyl polyesters, polyhydric polyalkylene ethers, polyhydric polythioethers, polyacetals or the like. They are therefore suitable for the preparation of coatings, castings, adhesives, as well as both flexible and rigid polyurethane foam materials which are in turn useful for coating wood, metal and the like. The foams are useful for making cushions, insulation or the like.

The invention is further illustrated by the following examples in which parts are by weight unless otherwise specified.

*Example 1*

About 88 g. (1 mol) of N,N'-dimethyl urea and about 1740 g. (10 mols) of 1-methyl-2,4-diisocyanatobenzene are heated under nitrogen at about 200° C. The dimethyl urea completely dissolves between about 40° C. and about 70° C. with a slight reaction. At about 110° C., yellowing begins and deepens as the reaction progresses. Methyl isocyanate is split off above about 150° C. In order to facilitate this, the pressure is reduced to about 320 mm. Hg at about 180° C. Within about 75 minutes at about 200° C., about 111 g. (97.4 percent of the theoretical) of methyl isocyanate are split off (B.P. at 760 mm. Hg:37° C.) and are collected in a cooled receiver. After cooling to room temperature, a golden yellow solution of polyisocyanate with a biuret structure in 1-methyl-2,4-diisocyanatobenzene with an isocyanate content of 39.2 percent and a viscosity of 32.7 cp./25° C. remains in the reaction vessel.

With a rotary evaporator, monomeric diisocyanate is almost completely separated from a polyisocyanate over about 30 minutes at about 115° C. and 0.1 mm. Hg. The polyisocyanate with a biuret structure is a brittle resin at room temperature with an isocyanate content of about 24.9 percent.

Example 2

A mixture of about 44 g. (0.5 mol) of N,N-dimethyl urea and about 840 g. (5 mols) of hexane-1,6-diisocyanate is heated for two hours at about 210° C./250 mm. Hg atmospheric oxygen having first been driven off. About 55 g. (96.5 percent of the theoretical) of methyl isocyanate are split off. The remaining light yellow mixture of polyisocyanate with a biuret structure and hexane-1,6-diisocyanate has an isocyanate content of about 39.3 percent and a viscosity of about 15 cp./25° C.

Examples 3–18

As in Example 1, the following N,N'-disubstituted ureas are reacted with diisocyanates:

TABLE 1

| Example | N,N'-disubstituted urea | Diisocyanate | Molar ratio | Time, hours | Temp., ° C. | Pressure, mm. Hg |
|---|---|---|---|---|---|---|
| 3 | Diethyl- | Hexane-1,6-diisocyanate | 1:6 | 5 | 200 | 300 |
| 4 | Diethyl- | 1-methyl-2,4-diisocyanatobenzene | 1:6 | 4 | 180 | 200 |
| 5 | Di-n-propyl- | Hexane-1,6-isocyanate | 1:6 | 5 | 200 | 200 |
| 6 | Diallyl- | ....do | 1:6 | 1.5 | 200 | 280 |
| 7 | Di-t-butyl- | ....do | 1:6 | 0.5 | 190 | 200 |
| 8 | Dicyclohexyl- | ....do | 1:6 | 5 | 180 | 200 |
| 9 | Diphenyl- | Diphenyl methane-4,4'-diisocyanate | 1:8 | 2 | 200 | 300 |
| 10 | Dimethyl | 1-methyl-2,4-diisocyanatobenzene | 1:10 | 0.5 | 210 | 400 |
| 11 | Diallyl- | Cyclohexane-1,4-diisocyanate | 1:10 | 2 | 200 | 300 |
| 12 | N-methyl-N'-benzyl | 1-methyl-2,4-diisocyanatobenzene | 1:10 | 2 | 200 | 300 |

TABLE 2

| Example | Bis-Ureas | Diisocyanate | Molar ratio | Time, hours | Temp., ° C. | Pressure, mm. Hg |
|---|---|---|---|---|---|---|
| 13 | $C_2H_5NH-CO-NH-CH_2CH_2CH_2$<br>$\quad\quad\quad\quad\quad\quad\quad\quad\quad\quad\quad\quad O$<br>$C_2H_5NH-CO-NH-CH_2CH_2CH_2$ | 1-methyl-2,4-diisocyanatobenzene | 1:10 | 2 | 200 | 300 |
| 14 | $CH_3NH-CO-NH-CH_2$<br>$CH_3NH-CO-NH-CH_2$ | ....do | 1:10 | 5 | 200 | 320 |
| 15 | $C_2H_5NH-CO-NH-(CH_2)_3-O-(CH_2)_2$<br>$\quad\quad\quad\quad\quad\quad\quad\quad\quad\quad\quad\quad\quad\quad O$<br>$C_2H_5NH-CO-NH-(CH_2)_3-O-(CH_2)_2$ | ....do | 1:10 | 2 | 200 | 300 |

TABLE 3

| Example | Monosubstituted ureas | Diisocyanate | Molar ratio | Time, hours | Temp., ° C. | Pressure, mm. Hg |
|---|---|---|---|---|---|---|
| 16 | Methylurea | Hexane-1,6-diisocyanate | 1:6 | 4 | 196 | 240 |
| 17 | Allylurea | ....do | 1:8 | 4.5 | 200 | 210 |
|  | Trisubstituted ureas |  |  |  |  |  |
| 18 | Trimethyl urea | ....do | 1:8 | 4 | 200 | 210 |

The following reaction products are obtained:

TABLE 4.—REACTION PRODUCTS

| Example | Isocyanate content of the mixture of polyisocyanate with biuret structure and monomeric diisocyanate, percent —NCO | Monoisocyanate | Boiling Point | Yield related to urea used in percent |
|---|---|---|---|---|
| 3 | 32.5 | Ethylisocyanate | 60 | 97.5 |
| 4 | 32.3 | ....do | 60 | 87.4 |
| 5 | 29.9 | m-Propylisocyanate | 88 | 96.6 |
| 6 | 30.5 | Allylisocyanate | 83 | 96.5 |
| 7 | 37.6 | t-Butyl-isocyanate | ...... | 98.5 |
| 8 | .......... | Cyclohexylisocyanate | [1] 58 | 73.7 |
| 9 | .......... | Methylisocyanate | 37 | 84.1 |
| 10 | 36.2 | Phenylisocyanate | 166 | 74.5 |
| 11 | 41.3 | Allylisocyanate | 83 | 99 |
| 12 | 33.6 | {Methylisocyanate<br>and<br>Benzylisocyanate} | 37<br><br>[2] 108–110 | }99 |
| 13 | 23.1 | Ethylisocyanate | 60 | 76.2 |
| 14 | .......... | Methylisocyanate | 37 | 75.5 |
| 15 | 36.4 | Ethylisocyanate | 60 | 99 |
| 16 | 25 | Methylisocyanate | 37 | 75.5 |
| 17 | 30.7 | Allylisocyanate | 83 | 70 |
| 18 | 37.3 | Methylisocyanate | 37 | 98.5 |

[1] At 14 mm. Hg.
[2] At 15 mm. Hg.

It is to be understood that the foregoing examples are given for the purpose of illustration and that any other suitable organic diisocyanate, substituted urea or the like could be used therein provided that the teachings of this disclosure are followed.

Although the invention has been described in considerable detail for the purpose of illustration, it is to be understood that variations can be made therein by those skilled in the art without departing from the spirit of the invention and the scope of the claims.

What is claimed is:

1. A process for the preparation of a biuret polyisocyanate which comprises reacting a urea selected from the group consisting of

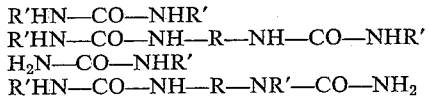

wherein R represents an aliphatic or aromatic divalent radical having 1 to 18 carbon atoms and R' represents an aliphatic or aromatic monovalent radical having 1 to 6 carbon atoms with an organic diisocyanate which is free from urethane groups in such proportions that there are at least 3 mols of organic diisocyanate present per mol of said urea at about 150–250° C. while continuously removing the organic monoisocyanate resulting from said reaction as rapidly as it is formed.

2. The process of claim 1 wherein said organic diisocyanate is a monomeric diisocyanate.

3. The process of claim 1 wherein R is a radical having from 1 to 18 carbon atoms and R' is an organic radical having from 1 to 6 carbon atoms.

4. The process of claim 1 wherein from 6 to 10 mols of monomeric organic diisocyanate are used per mol of said urea.

5. The process of claim 1 wherein R' is an alkyl radical having 1 to 6 carbon atoms.

6. A process for the preparation of a biuret polyisocyanate which comprises reacting an N,N'-di-lower-alkyl urea with hexamethylene diisocyanate in such proportions that there are from 6 to 10 mols of hexamethylene diisocyanate present per mol of said N,N'-di-lower alkyl urea at a temperature of from about 150° C. to about 250° C. while continuously removing the resulting lower alkyl monoisocyanate substantially as rapidly as it is formed.

References Cited

Wagner: Angewandt Chemie, vol. 74, July-December 1962, pp. 799–801.

Bunge: Angewandte Chemie, vol. 72, July-December 1960, p. 1002.

CHARLES B. PARKER, *Primary Examiner.*

D. H. TORRENCE, *Assistant Examiner.*